United States Patent
Mori (10) Patent No.: US 8,650,275 B2
(45) Date of Patent: Feb. 11, 2014

(54) REQUESTER-SIDE DISTRIBUTED ID MANAGEMENT DEVICE, PROVIDER-SIDE DISTRIBUTED ID MANAGEMENT DEVICE, DISTRIBUTED ID MANAGEMENT SYSTEM, AND PROVIDER-SIDE DISTRIBUTED ID MANAGEMENT METHOD

(75) Inventor: Takuya Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 12/922,791

(22) PCT Filed: Apr. 17, 2009

(86) PCT No.: PCT/JP2009/001784
§ 371 (c)(1),
(2), (4) Date: Sep. 15, 2010

(87) PCT Pub. No.: WO2009/128278
PCT Pub. Date: Oct. 22, 2009

(65) Prior Publication Data
US 2011/0022656 A1    Jan. 27, 2011

(30) Foreign Application Priority Data
Apr. 17, 2008 (JP) ................... 2008-107943

(51) Int. Cl.
*G06F 15/173* (2006.01)
*G06F 15/16* (2006.01)
*G06F 7/04* (2006.01)

(52) U.S. Cl.
USPC ............... 709/223; 709/225; 709/229; 726/5

(58) Field of Classification Search
USPC ............................. 709/223, 225, 229; 726/5
See application file for complete search history.

(56) References Cited

U.S. PATENT DOCUMENTS

2003/0149781 A1 *  8/2003  Yared et al. ................... 709/229
2007/0136786 A1 *  6/2007  Le Van Gong et al. ........... 726/3

FOREIGN PATENT DOCUMENTS

JP    2002312320 A   10/2002
JP    2004234329 A    8/2004
(Continued)

OTHER PUBLICATIONS

S. Cantor, J. Hodges, J. Kemp, and P. Thompson. Liberty ID-FF Architecture Overview. Thomas Wason ed., https://www.projectliberty.org/resources/specifications.php#box1, 2005. Version 1.2.*

(Continued)

*Primary Examiner* — Jeffrey R Swearingen
*Assistant Examiner* — Taylor Elfervig
(74) *Attorney, Agent, or Firm* — Sughrue Mion, PLLC (57) ABSTRACT

A requester-side distributed ID management device (11) includes: an ID managing unit (111) that holds first user identification information associated with first server identification information, the first user identification information being for identifying the user of a first service providing server (12); an ID request processing unit (114) that receives a request from the first service providing server (12) for management user identification information for identifying the user of the second ID management device (21), the user corresponding to the first user identification information; and an inter-domain cooperating unit (113) that requests the management user identification information received by the ID request processing unit (114) from the second ID management device (21), and acquires the management user identification information from the second ID management device (21). The ID request processing unit (114) transmits the management user identification information acquired by the inter-domain cooperating unit (113) to the first service providing server (12).

3 Claims, 4 Drawing Sheets (56) References Cited

FOREIGN PATENT DOCUMENTS

| JP | 2006252418 A | 9/2006 |
|----|--------------|--------|
| JP | 2008071226 A | 3/2008 |
| WO | 2004059415 A | 7/2004 |
| WO | 2004059478 A | 7/2004 |

OTHER PUBLICATIONS

Paul Madsen, Yuzo Koga, and Kenji Takahashi. 2005. Federated identity management for protecting users from ID theft. In Proceedings of the 2005 workshop on Digital identity management (DIM '05). ACM, New York, NY, USA, 77-83.*

Wolfgang Hommel. 2005. An architecture for privacy-aware inter-domain identity management. In Proceedings of the 16th IFIP/IEEE Ambient Networks international conference on Distributed Systems: operations and Management (DSOM'05), Jürgen Schönwälder and Joan Serrat (Eds.). Springer-Verlag, Berlin, Heidelberg, 48-59.*

Weizhong Qiang; Konstantinov, A., "The Design and Implementation of Standards-Based Grid Single Sign-On Using Federated Identity," High Performance Computing and Communications (HPCC), 2010 12th IEEE International Conference on , vol., No., pp. 458,464, Sep. 1-3, 2010.*

International Search Report for PCT/JP2009/001784 mailed May 19, 2009.

T. Wason, "Liberty ID-FF Architecture Overview" Liberty Alliance, 2005, pp. 1-44.

N. Pierson, "Overview of Active Directory Federation Services in Windows Server 2003 R2", Microsoft Corporation, Oct. 2005.

K. Ohkubo et al , "A Proposal of Distributed Authentication Method Using Authentication Ticket", Information Processing Society of Japan, IPSJ SIG Technical Reports, vol. 2006, No. 80, Jul. 20, 2006, pp. 47-52.

* cited by examiner

REQUESTER-SIDE DISTRIBUTED ID MANAGEMENT DEVICE, PROVIDER-SIDE DISTRIBUTED ID MANAGEMENT DEVICE, DISTRIBUTED ID MANAGEMENT SYSTEM, AND PROVIDER-SIDE DISTRIBUTED ID MANAGEMENT METHOD

This application is the National Phase of PCT/JP2009/001784, filed Apr. 17, 2009, which claims priority based on Japanese Patent Application No. 2008-107943, filed on Apr. 17, 2008, the entire contents of which are incorporated hereinto by reference.

TECHNICAL FIELD

The present invention relates to a requester-side distributed ID management device, a provider-side distributed ID management device, a distributed ID management system, a requester-side distributed ID management method, a provider-side distributed ID management method, a requester-side distributed ID management program, and a provider-side distributed ID management program.

BACKGROUND ART

Figure 4:
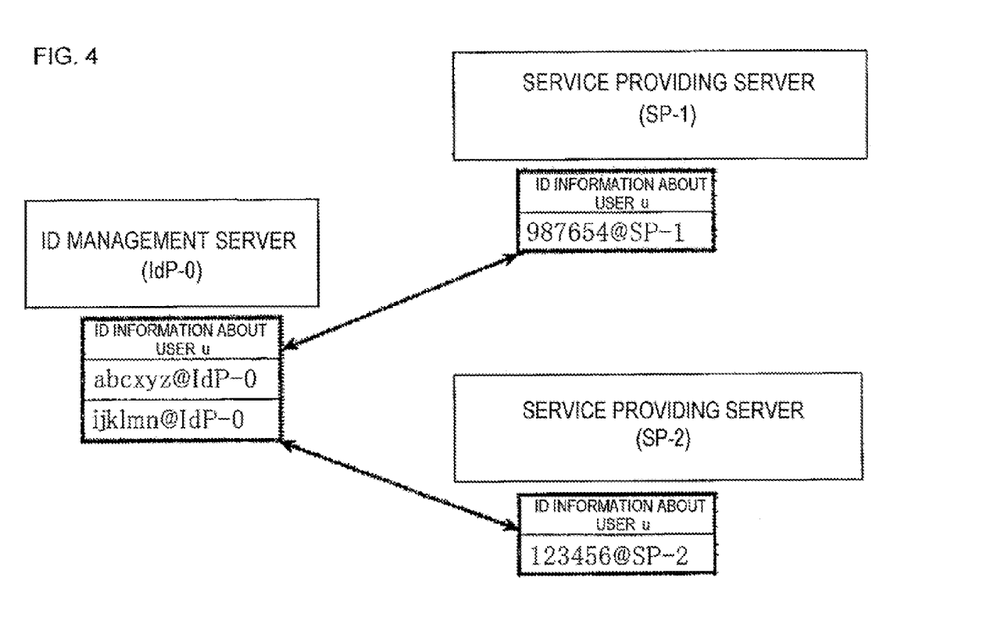
FIG. 4 is a block diagram of Non-Patent Document 1.

Non-Patent Document 1 discloses an example of a distributed ID (Identifier) management system. As shown in FIG. 4, the distributed ID management system disclosed in Non-Patent Document 1 includes an ID management server (IdP-0), a service providing server (SP-1), and a service providing server (SP-2).

The distributed ID management system having this structure operates in the following manner.

Specifically, the ID management server (IdP-0) and the service providing server (SP-1) associates the IDs (Identifiers) of a user (a user u, for example) registered in the respective servers with each other in advance. Likewise, the ID management server (IdP-0) and the service providing server (SP-2) associates the IDs of the same user u registered in the respective servers with each other in advance.

Here, the ID management server (IdP-0) manages to associate one ID of the user u with each of the associated service providing servers, even though the IDs belong to the same user, for example.

The user u then issues an authentication request to the ID management server (IdP-0) from a user terminal (not shown). When the user is authenticated, the ID management server (IdP-0) issues a request for a service to the service providing server (SP-1). In that case, the ID management server (IdP-0) transmits the user information (987654@SP-1) about the user u in the service providing server (SP-1) as an authenticated user to the service providing server (SP-1).

The ID management server (IdP-0) also transmits the user information (123456@SP-2) about the user u in the service providing server (SP-2) as an authenticated user to the service providing server (SP-2).

Meanwhile, Patent Document 1 discloses a technique for solving the problem of having to set a different ID of a user in each of different systems, and having to use the respective IDs of the user in the respective systems.

Patent Document 1 discloses the following method for transmitting authentication information. The reference numerals used in this paragraph correspond to those in FIG. 3 of Patent Document 1. A user authentication information transmitting unit 20d of a computer system 20 of a company A searches a user information storage unit 20c, extracts the user authentication information about a company B associated with first user authentication information about a user 1, and encrypts the extracted second user authentication information. The user authentication information transmitting unit 20d transmits the encrypted second user authentication information, together with the information necessary for accessing a computer system 30 of the company B, via a transmitting/receiving unit 20a.

Patent Document 1 also discloses a method for retrieving authentication information. Specifically, a user authenticating unit 30b of the second computer system 30 decrypts the second user authentication information received by a transmitting/receiving unit 30a. Based on the decrypted second user authentication information, the user authenticating unit 30b performs authentication by searching a user information storage unit 30c. The reference numerals used in this paragraph also correspond to those in FIG. 3 of Patent Document 1.

Meanwhile, Patent Document 2 discloses a single sign-on server. The reference numerals used in this paragraph correspond to those in FIG. 1 of Patent Document 2. This document discloses that, if an user ID is not mapped, the single sign-on server 11 reads the mapping ID of a company B from a mapping ID table 16, and registers the mapping ID in an ID mapping table 12.

[Non-Patent Document 1] Thomas Wason, et al., "Liberty ID-FF Architecture Overview", Liberty Alliance Project
[Patent Document 1] Japanese Laid-Open Patent Publication No. 2002-312320
[Patent Document 2] Japanese Laid-Open Patent Publication No. 2004-234329

DISCLOSURE OF THE INVENTION

The second problem with Patent Documents 1 and 2 is that ID managing units cannot cooperate with each other in a service between different systems (between systems over different domains). This is because such a cooperation in a service via two or more ID managing units has not been considered at all.

The present invention has been made in view of the above circumstances, and the object thereof is to provide a requester-side distributed ID management device, a provider-side distributed ID management device, and a distributed ID management system that can increase services to user terminals, with service providing servers cooperating with each other.

According to the present invention, there is provided a requester-side distributed ID management device that functions as a first ID management device in a distributed ID management system that includes: a first service providing server that belongs to a domain formed with a hierarchical structure; the first ID management device that holds the first server identification information for identifying the first service providing server; and a second ID management device that holds the server identification information for identifying a service providing server belonging to another domain different from the domain, the requester-side distributed ID management device including:

an ID managing unit that holds the first user identification information, which is for identifying the user of the first service providing server, associated with the first server identification information;

an ID request processing unit that receives a request for acquirement of management user identification information, which is for identifying the user of the second ID management device, from the first service providing server, the user corresponding to the first user identification information; and an inter-domain cooperating unit that acquires the management user identification information from the second ID management device, based on the request for acquirement, wherein the ID request processing unit transmits the management user identification information acquired by the inter-domain cooperating unit to the first service providing server.

According to the present invention, there is also provided a provider-side distributed ID management device that functions as a second ID management device in a distributed ID management system that includes: a first service providing server that belongs to a domain formed with a hierarchical structure; a first ID management device that holds the server identification information for identifying the first service providing server; a second service providing server that belongs to another domain different from the domain; and the second ID management device that holds the server identification information for identifying the second service providing server, the provider-side distributed ID management device including:

a server ID managing unit that holds the user identification information, which is associated with the management user identification information about the user associated with the server identification information about the second ID management device, about the user associated with the server identification information about the first ID management device; and a server ID request processing unit that receives a request from the first ID management device for the management user identification information corresponding to the user identification information associated with the server identification information about the first ID management device, whereon the server ID request processing unit reads the management user identification information held by the server ID managing unit in response to the received request, the server ID request processing unit transmitting the management user identification information to the first ID management device.

According to the present invention, there is also provided a distributed ID management system including:

first and second service providing servers that belong to different domains from each other, the domains being formed with hierarchical structures;

a first ID management device that holds the server identification information about the first service providing server;

a second ID management device that holds the server identification information about the second service providing server;

and a user terminal that communicates and connects with the first service providing server, the first ID management device including:

an ID managing unit that holds the first user identification information, which is for identifying the user of the first service providing server, associated with the server identification information about the first service providing server;

an ID request processing unit that receives a request for acquirement of management user identification information, which is for identifying the user of the second ID management device, from the first service providing server when receiving a request from the user terminal for a service to be provided by the second service providing server; and an inter-domain cooperating unit that acquires the management user identification information from the second ID management device, based on the request for acquirement, and the second ID management device including:

a server ID managing unit that holds the user identification information, which is associated with the management user identification information about the user associated with server identification information about the second ID management device, about the user associated with the server identification information about the first ID management device; and a server ID request processing unit that receives a request from the first ID management device for the management user identification information corresponding to the user identification information associated with the server identification information about the first ID management device, wherein the server ID request processing unit reads the management user identification information held by the server ID managing unit in response to the received request, and transmits the management user identification information to the first ID management device, the server ID request processing unit transmits the management user identification information acquired by the inter-domain cooperating unit to the first service providing server, the first service providing server requests second user identification information, which is for identifying the user of the second service providing server, from the second ID management device based on the management user identification information transmitted from the server ID request processing unit, and requests the service from the second service providing server based on the second user identification information.

According to the present invention, there is also provided a requester-side distributed ID management method of a requester-side distributed ID management device that functions as a first ID management device in a distributed ID management system that includes: a first service providing server that belongs to a domain formed with a hierarchical structure; the first ID management device that holds the first server identification information for identifying the first service providing server; and a second ID management device that holds the server identification information for identifying a service providing server belonging to another domain different from the domain, the requester-side distributed ID management method including:

holding the first user identification information, which is for identifying the user of the first service providing server, associated with the first server identification information;

receiving a request for acquirement of management user identification information, which is for identifying the user of the second ID management device, from the first service providing server, the user corresponding to the first user identification information; and acquiring the management user identification information from the second ID management device, based on the request for acquirement, wherein the receiving the request for the management user identification information includes transmitting the management user identification information acquired in the acquiring the management user identification information to the first service providing server.

According to the present invention, there is also provided a provider-side distributed ID management method of a provider-side distributed ID management device that functions as a second ID management device in a distributed ID management system that includes: a first service providing server that belongs to a domain formed with a hierarchical structure; a first ID management device that holds the server identification information for identifying the first service providing server; a second service providing server that belongs to another domain different from the domain; and the second ID management device that holds the server identification information for identifying the second service providing server, the provider-side distributed ID management method including:

holding the user identification information, which is associated with the management user identification information about the user associated with the server identification information about the second ID management device, about the user associated with the server identification information about the first ID management device; and receiving a request from the first ID management device for the management user identification information corresponding to the user identification information associated with the server identification information about the first ID management device, wherein the receiving the request for the management user identification information includes reading the management user identification information held by the holding the user identification information in response to the received request, and transmitting the management user identification information to the first ID management device.

According to the present invention, there is also provided a computer readable storage media that stores a requester-side distributed ID management program of a requester-side distributed ID management device that functions as a first ID management device in a distributed ID management system that includes: a first service providing server that belongs to a domain formed with a hierarchical structure; the first ID management device that holds the first server identification information for identifying the first service providing server; and a second ID management device that holds the server identification information for identifying a service providing server belonging to another domain different from the domain, the computer readable storage media that stores the requester-side distributed ID management program including:

an ID managing process to hold the first user identification information, which is for identifying the user of the first service providing server, associated with the first server identification information;

an ID request processing process to receive a request for acquirement of management user identification information, which is for identifying the user of the second ID management device, from the first service providing server, corresponding to the first user identification information; and an inter-domain cooperating process to acquire the management user identification information from the second ID management device, based on the request for acquirement, wherein the ID request processing process causes a computer to transmit the management user identification information acquired by the inter-domain cooperating process to the first service providing server.

According to the present invention, there is also provided a computer readable storage media that stores a provider-side distributed ID management program of a provider-side distributed ID management device that functions as a second ID management device in a distributed ID management system that includes: a first service providing server that belongs to a domain formed with a hierarchical structure; a first ID management device that holds the server identification information for identifying the first service providing server; a second service providing server that belongs to another domain different from the domain; and the second ID management device that holds the server identification information for identifying the second service providing server, the computer readable storage media that stores the provider-side distributed ID management program including:

a server ID managing process to hold the user identification information, which is associated with the management user identification information about the user associated with the server identification information about the second ID management device, about the user associated with the server identification information about the first ID management device; and a server ID request processing process to receive a request from the first ID management device for the management user identification information corresponding to the user identification information associated with the server identification information about the first ID management device, wherein the server ID request processing process causes a computer to read the management user identification information held by the server ID managing process in response to the received request, and transmit the management user identification information to the first ID management device.

The present invention provides a requester-side distributed ID management device, a provider-side distributed ID management device, and a distributed ID management system that can increase services to user terminals, with service providing servers cooperating with each other.

BRIEF DESCRIPTION OF THE DRAWINGS

The above and other objects, features and advantages will be more apparent from the following description of a preferred embodiment taken in conjunction with the accompanying drawings.

BEST MODE FOR CARRYING OUT THE INVENTION

The following is a detailed description of an embodiment of the present invention, with reference to the accompanying drawings.

Figure 1:
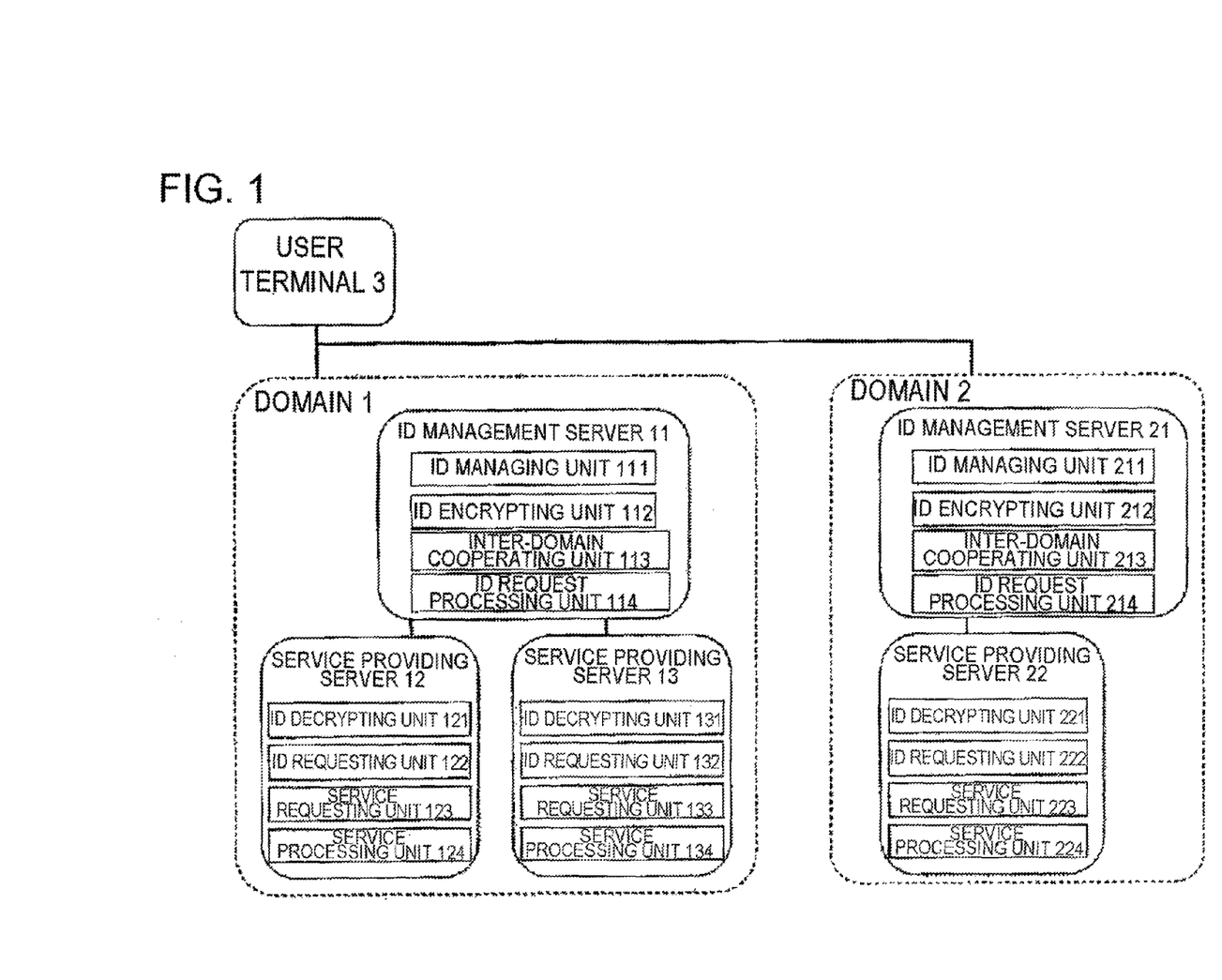
FIG. 1 is a functional block diagram showing the structure of a distributed ID management system according to a first embodiment of the present invention.

Referring to FIG. 1, a distributed ID management system according to a first embodiment of the present invention includes a domain 1, a domain 2, and a user terminal 3.

The domain 1 includes an ID management server (a requester-side distributed ID management device that functions as a first ID management device) 11, a service providing server (a first service providing server) 12, and a service providing server 13. The domain 2 includes an ID management server (a provider-side distributed ID management device that functions'as a second ID management device) 21, and a service providing server (a second service providing server) 22.

The ID management server 11 shown in FIG. 1 is a requester-side distributed ID management device that functions as an ID management server in the distributed ID management system that includes the service providing server 12 belonging to the domain 1 formed with a hierarchical structure, the ID management server 11 holding the server identification information for identifying the service providing server 12, and the ID management server 21 holding the server identification information for identifying the service providing server 22 belonging to the domain 2 that is different from the domain 1. The ID management server 11 includes: an ID managing unit 111 that holds a user's first ID (first user identification information) for identifying the user of the service providing server 12; an ID request processing unit 114 that receives from the service providing server 12 a request for acquirement of a management user ID (management user identification information) for identifying the user of the ID management server 21 corresponding to the first ID of the user; and an inter-domain cooperating unit 113 that acquires the management user ID from the ID management server 21, based on the request for acquirement. The ID request processing unit 114 transmits the management user ID acquired by the inter-domain cooperating unit 113 to the service providing server 12.

The ID management server 21 shown in FIG. 1 is a provider-side distributed ID management device that functions as an ID management server in the distributed ID management system that includes the service providing server 12 belonging to the domain 1 formed with a hierarchical structure, the ID management server 11 holding the server identification information for identifying the service providing server 12, the service providing server 22 belonging to the domain 2 that is different from the domain 1, and the ID management server 21 holding the server identification information for identifying the service providing server 22. The ID management server 21 includes: an ID managing unit (a server ID managing unit) 211 that holds and associates the first ID of the user associated with the server identification information about the ID management server 11 with the management user ID associated with the server identification information about the ID management server 21; and an ID request processing unit (a server ID request processing unit) 214 that receives from the ID management server 11 a request for the management user ID corresponding to the first ID of the user associated with the server identification information about the ID management server. The ID request processing unit 214 reads the management user ID held in the ID managing unit 211 according to the received request, and transmits the management user ID of the user to the ID management server 11.

According to this embodiment, the ID management server 11 acquires the management user ID from the ID management server 21. The ID management server 11 then transmits the management user ID to the service providing server 12. Based on the management user ID, the service providing server 12 connects with the ID management server 21.

The service providing server 12 acquires a second ID of the user of the service providing server 22 corresponding to the management user ID from the ID management server 21.

Accordingly, when the service providing server 12 acquires the second ID of the user of the service providing server 22, the service providing server 12 can start connecting and communicating with the service providing server 22.

As the service providing server 12 and the service providing server 22 cooperate with each other in the above manner, the distributed ID management system can provide many services to the user terminal 3.

When the first ID of the user is not stored in association with the service providing server 12, the ID managing unit 111 generates an ID for identifying a user of the service providing server, and holds and associates the ID as a new user with the service providing server.

When the second ID of the user is not stored, the ID managing unit 211 generates new user identification information for identifying the user of the service providing server 22, and holds and associates the new user identification information with the server identification information about the service providing server 22. The ID managing unit 211 also holds and associates the new user identification information as the second ID of the user with the server identification information about the ID management server 21.

The ID management server 11 includes an ID encrypting unit 112 that encrypts the user's first ID for identifying the user of each service providing server.

The ID management server 21 includes an ID encrypting unit 212 that encrypts at least either the user's second ID held in the ID managing unit 211 or the user identification information about the service providing server 22.

The ID encrypting unit 212 performs encryption by an encryption method for enabling the service providing server 22 to decrypt the ID of the user of the service providing server 22 requested by the inter-domain cooperating unit 113.

The service providing server 12 includes an ID decrypting unit 121 that decrypts encrypted user identification information, an ID requesting unit 122 that requests a user ID, a service requesting unit 123 that requests a service from a service providing server, and a service processing unit 124.

Like the service providing server 12, the service providing server 13 includes an ID decrypting unit 131, an ID requesting unit 132, a service requesting unit 133, and a service processing unit 134.

The ID management server 21 includes the function as the ID management server 11, as well as the functions as the above described provider-side distributed ID management device. In other words, the ID management server 21 includes the ID managing unit 211, an ID encrypting unit 212, an inter-domain cooperating unit 213, and the ID request processing unit 214. Likewise, the ID management server 11 has the function as the ID management server 21, as Well as the functions as the above described requester-side distributed ID management device.

The service providing server 22 includes an ID decrypting unit 221, an ID requesting unit 222, a service requesting unit 223, and a service processing unit 224.

Here, the ID management server 11 manages the IDs of the user in the domain 1. The ID management server 21 manages the IDs of the user in the domain 2.

Functional blocks with the same name perform the same processing. Also, each of those functional blocks basically operates as follows.

The ID managing unit 111 manages the IDs of the user in the ID management server 11, the service providing server 12, and the service providing server 13, which belong to the domain 1. Specifically, the ID managing unit 111 holds the associations between the IDs of the user and the respective servers.

The ID encrypting unit 112 has the function to encrypt an ID so that the ID is not disclosed to the other service providing server in an ID request processing operation to cooperate in a service from the service providing server 12 belonging to the domain 1 to the service providing server 22 belonging to the domain 2, for example.

The inter-domain cooperating unit 113 acquires the ID of the user in the ID management server 21 in the domain 2, so as to respond to the service providing server 12 as the ID requester in cooperation with the ID management server 21 belonging to the domain 2.

The ID request processing unit 114 receives an ID acquirement request to cooperate in a service from the service providing server 12 belonging to the domain 1, and returns an encrypted ID to the requester.

When cooperating in a service of the service providing server 22 belonging to the domain 2, the ID decrypting unit 121 decrypts the encrypted user ID received from the service providing server 22.

To cooperate with the service providing server 22 in a service, the ID requesting unit 122 inquires of the ID management server 21 and requests the encrypted ID of the user in the service of the service providing server 22.

To cooperate with the service providing server 22 in a service, the service requesting unit 123 requests the service from the service providing server 22.

The service processing unit 124 responds to a service request (a request for a service) from the service providing server 22 or the user terminal 3, and provides the service. The above also applies to the other servers and the other functional blocks shown in the drawings.

Figure 2:
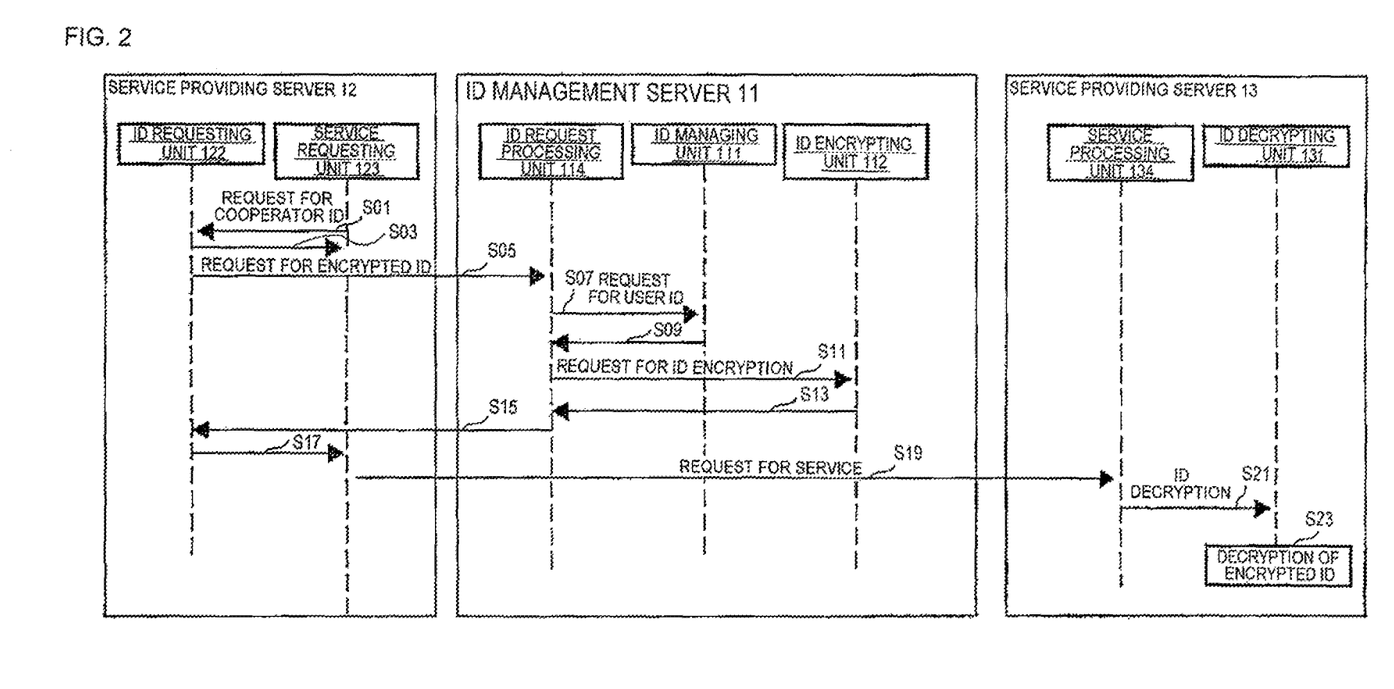
FIG. 2 is a sequence diagram showing a preferred operation for a first embodiment of the present invention.
Figure 3:
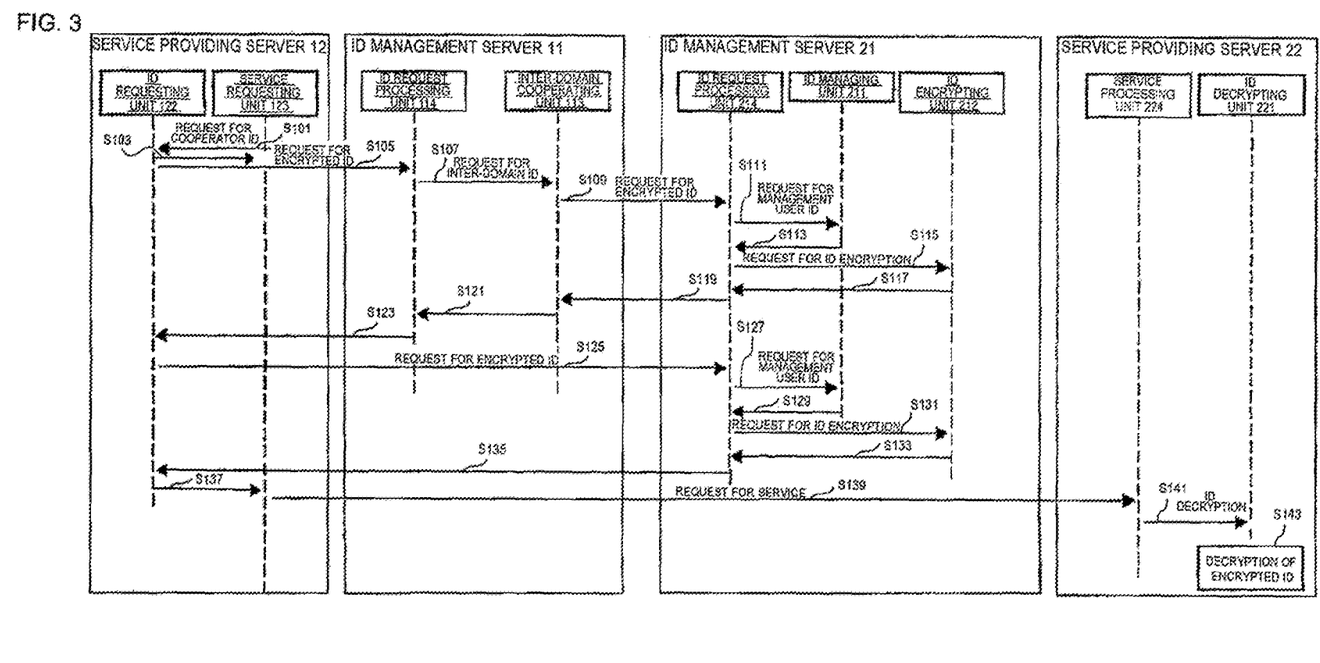
FIG. 3 is a sequence diagram showing a preferred operation for a first embodiment of the present invention.

Referring now to the sequence diagrams of FIGS. 2 and 3, an entire operation of this embodiment is described in detail.

Referring first to the sequence diagram of FIG. 2, a cooperation in a service in the domain 1 is described.

The service requesting unit 123 requests the ID of a cooperator as a service cooperator (the server ID of the service providing server 13 in this case) from the ID requesting unit 122 (step S01).

The ID requesting unit 122 transmits the cooperator ID to the service requesting unit 123 (step S03). The ID requesting unit 122 requests the encrypted ID of the user in the service cooperator from the ID request processing unit 114 (step S05).

The ID request processing unit 114 then requests the ID of the user in the service providing server 13 corresponding to the user in the service providing server 12 from the ID managing unit 111 (step S07).

If the ID of the user corresponding to the request by the ID request processing unit 114 exists, the ID managing unit 111 returns the ID of the user. If the ID of the user corresponding to the request by the ID request processing unit 114 is not registered yet, on the other hand, the ID managing unit 111 creates the ID of the user in the service providing server 13 that is a new cooperator. The ID managing unit 111 associates the created ID of the user with the ID of the user in the service providing server 12 that is the caller, and then returns the created ID of the user to the ID request processing unit 114 (step S09).

Further, the ID request processing unit 114 transmits an ID encryption request to the ID encrypting unit 112, to encrypt the received ID of the user in the service providing server 13 with an encryption key of the service providing server 13 that is a service cooperator (step S11).

Receiving the ID encryption request, the ID encrypting unit 112 encrypts the received ID of the user. The ID request processing unit 114 then acquires the user ID encrypted by the ID encrypting unit 112 (step S13). Here, a user ID encrypted with an encryption key is called an encrypted ID.

The ID request processing unit 114 transmits the acquired encrypted ID to the ID requesting unit 122 (step S15).

Receiving the encrypted ID from the ID request processing unit 114, the ID requesting unit 122 transmits the received encrypted ID to the service requesting unit 123 (step S17).

Receiving the encrypted ID, the service requesting unit 123 issues a service request to the service processing unit 134 of the service providing server 13, based on the encrypted ID and the cooperator ID (step S19).

Receiving the service request from the service requesting unit 123, the service processing unit 134 issues an encrypted ID decryption request to the ID decrypting unit 131 (step S21).

As the ID decrypting unit 131 decrypts the encrypted ID, the service providing server 13 can acquire the ID of the user associated with the service providing server 13 (step S23).

Referring now to the sequence diagram of FIG. 3, a cooperation in an inter-domain service between the domain 1 and the domain 2 is described.

The service requesting unit 123 of the service providing server 12 requests the ID of a cooperator as a service cooperator (the service providing server 22 in this case) from the ID requesting unit 122 (step S101).

The ID requesting unit 122 transmits the cooperator ID to the service requesting unit 123 (step S103). The ID requesting unit 122 requests the encrypted user ID (or the encrypted ID) in the service cooperator from the ID request processing unit 114 of the ID management server 11 (step S105).

The ID request processing unit 114 then requests the ID of the management user in the ID management server 21 corresponding to the first ID of the user in the ID management server 11 from the inter-domain cooperating unit 113 (step S107). The inter-domain cooperating unit 113 requests the ID of the management user in the ID management server 21 from the ID request processing unit 214 (step S109).

The ID request processing unit 214 then requests the ID of the management user in the ID management server 21 corresponding to the user in the ID management server 11 from the ID managing unit 211 (step S111).

If the ID of the management user corresponding to the request by the ID request processing unit 214 exists, the ID managing unit 211 returns the ID of the management user. If the ID of the management user corresponding to the request by the ID request processing unit 214 is not registered yet, on the other hand, the ID managing unit 211 creates the ID of the user in the ID management server 21 (or creates the management user ID). The ID managing unit 211 also creates the second ID of the user in the service providing server 22 as a cooperator. The ID managing unit 211 associates the first ID of the user in the ID management server 11 with the management user ID, and then returns the management user ID to the ID request processing unit 214 (step S113).

At this point, the ID managing unit 211 stores the management user ID in the ID management server 21 associated with the second ID of the user in the service providing server 22.

The ID request processing unit 214 transmits an ID encryption request to the ID encrypting unit 212, to encrypt the received management user ID with an encryption key of the service providing server 22 that is a service cooperator (step S115).

Receiving the ID encryption request, the ID encrypting unit 212 encrypts the received management user ID. The ID request processing unit 214 then acquires the management user ID encrypted by the ID encrypting unit 212 (this ID is called the encrypted management user ID) (step S117).

The ID request processing unit 214 transmits the acquired encrypted management user ID to the inter-domain cooperating unit 113 (step S119).

Receiving the encrypted management user ID from the ID request processing unit 214, the inter-domain cooperating unit 113 transmits the received encrypted management user ID to the ID request processing unit 114 (step S121). Receiving the encrypted management user ID from the inter-domain cooperating unit 113, the ID request processing unit 114 transmits the received encrypted management user ID to the ID requesting unit 122 of the service providing server 12 (step S123).

The ID requesting unit 122 requests the ID of the user in the service providing server 22 that is a service cooperator by presenting the acquired encrypted ID of the management user in the ID management server 21, from the ID request processing unit 214 (step S125).

The ID request processing unit 214 then requests the management user ID in the ID management server 21 and the corresponding second ID of the user in the service providing server 22 from the ID managing unit 211 (step S127).

If the corresponding second ID of the user exists in the service providing server 22, the ID managing unit 211 returns the second ID of the user. If the corresponding ID of the user is not registered in the service providing server 22 yet, on the other hand, the ID managing unit 211 creates the second ID of the user in the service providing server 22 that is a cooperator. The ID managing unit 211 associates the second ID of the user with the management user ID in the ID management server 21, and then returns the second user ID of the user to the ID request processing unit 214 (step S129).

Further, the ID request processing unit 214 transmits an ID encryption request to the ID encrypting unit 212, to encrypt the received second ID of the user with an encryption key of the service providing server 22 that is a service cooperator (step S131).

Receiving the ID encryption request, the ID encrypting unit 212 encrypts the received second ID of the user. The ID request processing unit 214 then acquires the second user ID encrypted by the ID encrypting unit 212 (this ID is called the encrypted second ID) (step S133).

The ID request processing unit 214 transmits the acquired encrypted second ID to the ID requesting unit 122 of the service providing server 12 (step S135).

The ID requesting unit 122 receives the encrypted second ID from the ID request processing unit 214. Receiving the encrypted second ID, the ID requesting unit 122 transmits the received encrypted second ID to the service requesting unit 123 (step S137). Receiving the encrypted second ID, the service requesting unit 123 issues a service request to the service processing unit 224 of the service providing server 22, based on the encrypted second ID and the service cooperator ID (step S139).

Receiving the service request based on the encrypted second ID from the service requesting unit 123 of the service providing server 12, the service processing unit 224 issues an encrypted second ID decryption request to the ID decrypting unit 221 (step S141).

As the ID decrypting unit 221 decrypts the encrypted second ID, the service providing server 22 can acquire the second ID of the user associated with the service providing server 22 (step S143).

As described above, according to this embodiment, the inter-domain cooperating unit 113 is designed to cause the ID management server 11 and the ID management server 21 to cooperate with each other. With this structure, a distributed-type ID management system that does not require an ID management device of a centralized type can be realized.

As described above, according to this embodiment, service providing servers can cooperate with each other between domains (systems) with different objects to be managed. Accordingly, it is possible to increase applicable services.

Also, in this embodiment, the ID of a user is encrypted by the ID encrypting unit 212. Accordingly, when the service providing server 22 cooperates in a service, the cooperation in the service can be realized without a disclosure of the ID of the user to the service providing server 12.

Furthermore, in this embodiment, the IDs of a user in the service providing server 22 as a cooperator and in the ID management server 21 are created when the ID of the corresponding user does not exist. Accordingly, it is possible to dynamically provide user IDs to the service providing server 22.

The present invention is not limited to the above embodiment, and various modifications may be made to the embodiment within the technical scope of the invention.

For example, this embodiment includes the following technical scope.

The distributed ID management device formed with ID management servers is characterized by including: an ID managing unit that manages the ID of the user of each server that provides services in service providing servers to be managed; an ID encrypting unit that performs ID encryption to transmit the ID of the user to another cooperating service providing server without a disclosure of the ID of the user to the other service providing server; and an inter-domain cooperating unit that realizes the ID cooperation necessary to realize a cooperation in a service with a service providing server belonging to another domain.

The above described distributed ID management device may be characterized by including: an ID requesting unit that inquires of the ID management server about the ID of the user of the cooperator when a service cooperation is performed with another service providing server; and a unit that decrypts the ID of the user when a service cooperation request is received from another service providing server.

The above described distributed ID management device may be characterized by including a unit that manages the IDs of the user of each service providing server among service providing servers to be managed, holds the association between each service providing server with the user ID, generates the user ID for the service provider if there is not a user ID associated with the service provider, and newly adds the user ID to the associations.

The above described distributed ID management device may also be characterized in that the ID encrypting unit includes a unit that keeps the user ID of the service providing server as the cooperator secret by such a method that the user ID in the service providing server as the cooperator is not disclosed to the service providing server as the caller, and only the service providing server as the cooperator can disclose the user ID in the service providing server as the cooperator to communicate with the service providing server as the caller.

The above described distributed ID management device may also be characterized in that the inter-domain cooperating unit includes a unit that requests an ID from another ID management server to transmit the user ID in the ID management server to the service providing server as the cooperator, so that the service providing server as the cooperator inquires of the ID management server about the ID of the user in the service providing server as the cooperator, where the service providing server of the cooperator is under the control of the ID management server.

The invention claimed is:

1. A distributed ID management system comprising:
a first ID management apparatus comprising hardware;
a first service providing server belonging to a domain that is the same as that of the first ID management apparatus;
a second ID management apparatus belonging to another domain and also comprising hardware; and
a second service providing server belonging to said another domain that is the same as that of the second ID management apparatus, wherein
the first ID management apparatus includes:
an inter-domain cooperating unit implemented at least by the hardware and that requests a management user identifier in the second ID management apparatus that is associated with a user identifier in the first ID management apparatus itself to the second ID management apparatus; and an ID requesting processing unit implemented at least by the hardware and that transmits the management user identifier in the second ID management apparatus that is obtained from the second ID management apparatus to the first service providing server, the first service providing server includes:

an ID requesting unit implemented at least by the hardware and that obtains the management user identifier in the second ID management apparatus from the first ID management apparatus, and requests a user identifier in the second service providing server to the second ID management apparatus by presenting the management user identifier in the second ID management apparatus that is obtained from the first ID management apparatus; and a service requesting unit implemented at least by the hardware and that directly requests the second service providing server to provide a service by using the user identifier in the second service providing server that is received from the second ID management apparatus, and the second ID management apparatus includes:

an ID managing unit implemented at least by the hardware and that holds the management user identifier in the second ID management apparatus itself, the user identifier in the first ID management apparatus, and the user identifier in the second service providing server in a manner in which they are associated with each other; and an ID request processing unit implemented at least by the hardware and that transmits, to the first ID management apparatus, the management user identifier in the second ID management apparatus itself that is associated with the user identifier in the first ID management apparatus and is held by the ID managing unit in response to the request from the first ID management apparatus, and transmits, to the first service providing server, the user identifier in the second service providing server that is held by the ID managing unit in a manner that is associated with the management user identifier in the second ID management apparatus itself designated in the request from the first service providing server.

2. A method performed in relation to a first ID management apparatus having hardware, a first service providing server belonging to a domain that is the same as that of the first ID management apparatus, a second ID management apparatus belonging to another domain and also having hardware, and a second service providing server belonging to said another domain that is the same as that of the second ID management apparatus, wherein the method comprises:

requesting from the second ID management apparatus, by an inter-domain cooperating unit of the first ID management apparatus, a management user identifier in the second ID management apparatus that is associated with a user identifier in the first ID management apparatus itself;

transmitting to the first service provider, by an ID requesting processing unit of the first ID management apparatus, the management user identifier in the second ID management apparatus that is obtained from the second ID management apparatus;

obtaining from the first ID management apparatus, by an ID requesting unit of the first service providing server, the management user identifier in the second ID management apparatus;

requesting from the second ID management apparatus, by the ID requesting unit of the first service providing server, a user identifier in the second service providing server by presenting the management user identifier in the second ID management apparatus that is obtained from the first ID management apparatus;

directly requesting the second service providing server, by a service requesting unit of the first service providing server, a service by using the user identifier in the second service providing server that is received from the second ID management apparatus;

holding, by an ID management unit of the second ID management apparatus, the management user identifier in the second ID management apparatus itself, the user identifier in the first ID management apparatus, and the user identifier in the second service providing server in a manner in which they are associated with each other;

transmitting to the first ID management apparatus, by an ID request processing unit of the second ID management apparatus, the management user identifier in the second ID management apparatus itself that is associated with the user identifier in the first ID management apparatus and is held by the ID managing unit in response to the request from the first ID management apparatus; and transmitting to the first service providing server, by the ID request processing unit of the second ID management apparatus, the user identifier in the second service providing server that is held by the ID managing unit in a manner that is associated with the management user identifier in the second ID management apparatus itself designated in the request from the first service providing server.

3. A non-transitory computer-readable data storage medium storing one or more computer programs executable by a first ID management apparatus having hardware, a first service providing server belonging to a domain that is the same as that of the first ID management apparatus, a second ID management apparatus belonging to another domain and also having hardware, and a second service providing server belonging to said another domain that is the same as that of the second ID management apparatus, the one or more computer programs executable to perform a method comprising:

requesting from the second ID management apparatus, by an inter-domain cooperating unit of the first ID management apparatus, a management user identifier in the second ID management apparatus that is associated with a user identifier in the first ID management apparatus itself;

transmitting to the first service provider, by an ID requesting processing unit of the first ID management apparatus, the management user identifier in the second ID management apparatus that is obtained from the second ID management apparatus;

obtaining from the first ID management apparatus, by an ID requesting unit of the first service providing server, the management user identifier in the second ID management apparatus;

requesting from the second ID management apparatus, by the ID requesting unit of the first service providing server, a user identifier in the second service providing server by presenting the management user identifier in the second ID management apparatus that is obtained from the first ID management apparatus;

directly requesting the second service providing server, by a service requesting unit of the first service providing server, a service by using the user identifier in the second service providing server that is received from the second ID management apparatus;

holding, by an ID management unit of the second ID management apparatus, the management user identifier in the second ID management apparatus itself, the user identifier in the first ID management apparatus, and the user identifier in the second service providing server in a manner in which they are associated with each other;

transmitting to the first ID management apparatus, by an ID request processing unit of the second ID management apparatus, the management user identifier in the second ID management apparatus itself that is associated with the user identifier in the first ID management apparatus and is held by the ID managing unit in response to the request from the first ID management apparatus; and transmitting to the first service providing server, by the ID request processing unit of the second ID management apparatus, the user identifier in the second service providing server that is held by the ID managing unit in a manner that is associated with the management user identifier in the second ID management apparatus itself designated in the request from the first service providing server.

* * * * *